United States Patent [19]

Itoh et al.

[11] 3,983,471

[45] Sept. 28, 1976

[54] VOLTAGE REGULATING SYSTEM

[75] Inventors: Katsumi Itoh, Ohbu; Kazumasa Mori, Aichi, both of Japan

[73] Assignee: Nippondenso Co., Ltd., Japan

[22] Filed: Feb. 5, 1975

[21] Appl. No.: 567,952

[30] Foreign Application Priority Data

Feb. 2, 1975 Japan .............................. 49-16659

[52] U.S. Cl. .................................... 322/28; 317/31; 317/33 VR; 320/64

[51] Int. Cl.[2] ........................ H02H 7/06; H02J 7/16

[58] Field of Search ............ 320/59, 64, 68; 322/28; 317/33 VR, 33 SC, 31

[56] References Cited

UNITED STATES PATENTS

| | | | |
|---|---|---|---|
| 3,332,006 | 7/1967 | Worrell et al. | 317/33 VR X |
| 3,469,168 | 9/1969 | Harland, Jr. et al. | 322/28 X |
| 3,539,864 | 11/1970 | Harland, Jr. et al. | 322/28 X |
| 3,855,517 | 12/1974 | Allport | 322/28 X |

*Primary Examiner*—J D Miller
*Assistant Examiner*—Robert J. Hickey
*Attorney, Agent, or Firm*—Cushman, Darby & Cushman

[57] ABSTRACT

A voltage regulating system is used to regulate the output voltage of an alternating current generator which serves to supply electrical loads on a motor vehicle including a battery. The field winding of the generator is supplied with current through the voltage regulating system operating in a switching mode.

The voltage regulating system includes a voltage sensing circuit connected with the battery, a control transistor connected with the voltage sensing circuit for effecting ON-OFF of a field current, and a protection circuit having a PNP transistor and a zener diode connected between an output terminal of the generator and the voltage sensing circuit which becomes operable to effect ON-OFF of the field current when the voltage sensing circuit is disconnected from the battery, whereby the output voltage of the generator is regulated at a lower level than that regulated by the voltage sensing circuit during such a disconnection.

6 Claims, 11 Drawing Figures

VOLTAGE REGULATING SYSTEM

BACKGROUND OF THE INVENTION

1. Field of the Invention

The present invention relates to an improvement of a voltage regulating system for controlling an output voltage of a direct current power supply that is utilized not only to supply electrical load on an automotive vehicle but to charge a storage battery installed in the automotive vehicle.

2. Description of Prior Art

A conventional voltage regulating system, for example, exemplified in the U.S. Pat. No. 3,469,168, comprises a first voltage sensing circuit connected to a storage battery for detecting a voltage thereof applied thereto by a direct current power source, a second voltage sensing circuit connected to said power source at another positive terminal, and a field control circuit connected to said first and second voltage sensing circuit and a field winding, whereby the battery voltage is controlled at a first preset level by the first voltage sensing circuit, and in the event that the first voltage sensing circuit disconnected from the battery, the battery voltage is controlled at a second preset level by the second voltage sensing circuit.

However it has a disadvantage that the second preset level is higher than the first one, whereby the battery may be overcharged or the life-time thereof may be shortened due to the overcharge.

SUMMARY OF THE INVENTION

It is, therefore, a primary object of the present invention to provide a voltage regulting system enabling control of the output voltage of the generator in the event that the battery is disconnected from the generator or the like.

It is another object of the present invention to provide a voltage regulating system enabling control of the output voltage of the generator at a lower level than that controlled at a normal condition when the malfunction occurs.

DESCRIPTION OF THE PREFERRED EMBODIMENTS

Figure 1:
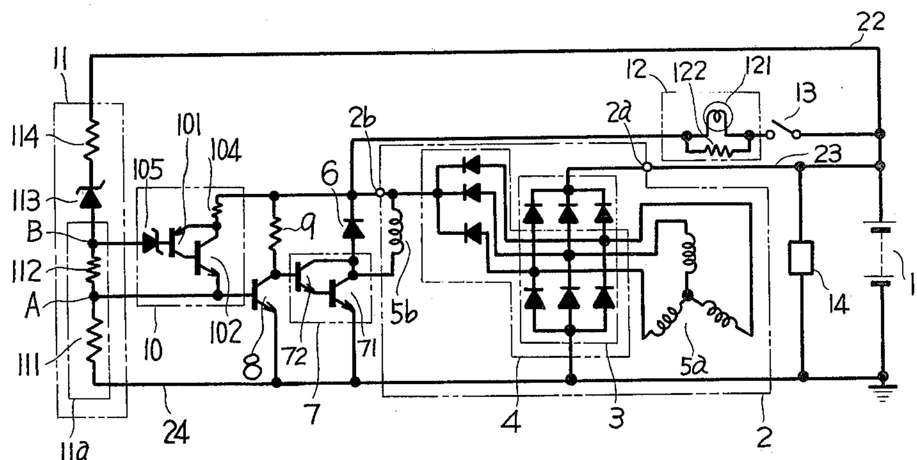
FIG. 1 is a schematic circuit diagram of a voltage regulating system according to the present invention.

Referring to FIG. 1 showing a first embodiment of the present invention, the reference numeral 2 generally designates a direct current power source which takes the form of a diode-rectified alternating current generator which is used to supply battery charging current on a motor vehicle and is used to supply other electrical loads on the motor vehicle when the generator is driven by the engine of the motor vehicle. The power source 2 includes an alternating current generator having a three phase Y-connected output winding 5*a* which is connected to the A.C. input terminals of a three phase full-wave bridge rectifier 3 which provides at one end a positive terminal 2*a*. The generator includes a field winding 5*b* which controls the output voltage of the generator. As current through the field winding 5*b* is increased the output voltage of the generator increases and when this current is reduced the output voltage of the generator decreases.

The power source also includes three auxiliary diodes providing another positive terminal 2*b* and forming another full wave bridge rectifier 4 in combination with a part of the rectifier 3.

The positive terminal 2*a* is connected with a storage battery 1 through a power supply conductor 23, to which an electical load 14 is connected. The other positive terminal 2*b* is also connected with the battery through a key switch 13 and a charge display circuit 12 including a display lamp 121 and a resistor 122.

A series circuit 11 of a resistor 114, a zener diode 113, and resistors 111 and 112 is connected across the battery 1 through a positive conductor 22 and a negative conductor 24, forming a voltage sensing circuit for sensing a battery voltage applied thereto. The resistors 111 and 112 form a voltage dividing circuit 11*a*, and a junction point A therebetween is connected to a base of a control transistor 8 whose emitter is connected with the negative conductor 24 and whose collector is connected to a base of a input transistor 72 forming a Darlington amplifier 7 in combination with an output transistor 71. The emitter of the output transistor 71 is connected with the negative conductor 24 and the collector thereof is connected with the auxiliary three diodes through the field winding 5*b* and also with the positive terminal 2*b* through a diode 6. The collector of the control transistor 8 is connected with the positive terminal 2*b* through a resistor 9 and also with a junction point B between the resistor 112 and the zener diode 113 through a protection circuit 10 including a PNP transistor 101, a NPN transistor 102, a resistor 104 and a zener diode 105.

The operation of this embodiment will be explained.

When the key switch 13 is closed an electric current flows through the charge display circuit 12, the field winding 5*b* and to the output transistor 71. At this stage, the voltage sensing circuit 11 detects less voltage than needed to make the control transistor 8 conductive, so then the output transistor 71 is in the conduction state, whereby the field winding 5*b* provides initial excitation for the generator 2.

When an engine (not shown) of the automotive vehicle starts to rotate and drives the generator 2, the output voltage thereof rises and is regulated at a desired level.

As the output voltage of the generator 2 rises above a predetermined level, the zener diode 113 is broken down to make the control transistor 8 conductive. The base current to the Darlington amplifier 7 thereby flows through the control transistor 8. The output transistor 71 is made non-conductive so that the field current may flow through the diode 6 and the control transistor 8 to the negative conductor 24 with a gradual decrease of the output voltage of the generator 2.

When the output voltage of the generator 2 decreases below the predetermined level the zener diode 113, and consequently the control transistor 8 are made non-conductive, thereby to make the output transistor 71 conductive in order to flow the field current through the field winding 5*b*, whereby the output voltage of the generator 2 rises again. Thus, the above described operation is repeated to control and maintain the battery voltage at a desired level.

In the event that the power supply conductor 23 is disconnected from the generator 2, or the voltage sensing circuit 11 is disconnected from the battery 1 due to a line failure of the positive conductor 22, the protection circuit 10 is made conductive and nonconductive in response to the output voltage of the generator 2 at its positive terminal 2*b* to finally switch off and on the field current, thereby to regulate the output voltage of the generator 2 at another desired level determined by the protection circuit 10.

The operation in the events of the malfunction described above will be explained more in detail.

Figure 2:
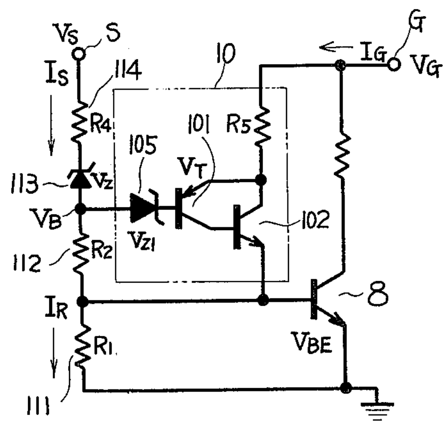
FIG. 2 is a partial circuit diagram of FIG. 1 showing circuit constant.

Assuming each circuit constant as designated in FIG. 2, a voltage $V_S$ applied across the voltage sensing circuit 11, namely an electric potential at a terminal $S$ is introduced by the following equation (1) when both the protection circuit 10 and the control transistor 8 are nonconductive.

$$V_S = I_S\,(R_1 + R_2 + R_4) + V_Z \quad (1)$$

wherein $R_1$, $R_2$, $R_4$: resistance values of the resistors 111, 112 and 114

$V_Z$: a voltage drop across the zener diode 113

$I_S$: a value of electric current through the circuit 11.

A desired regulated voltage $V_{reg}$ of the generator is the voltage $V_S$ determined when the control transistor 8 is made conductive, that is, when the base potential $I_S R_1$ of the control transistor 8 attains to a voltage $V_{BE}$ across the base-emitter thereof.

Therefore, the regulated voltage $V_{reg}$ is given by the following equation (2).

$$V_{reg} = \frac{V_{BE}}{R_1}(R_1 + R_2 + R_4) + V_Z \quad (2)$$

Figure 3:
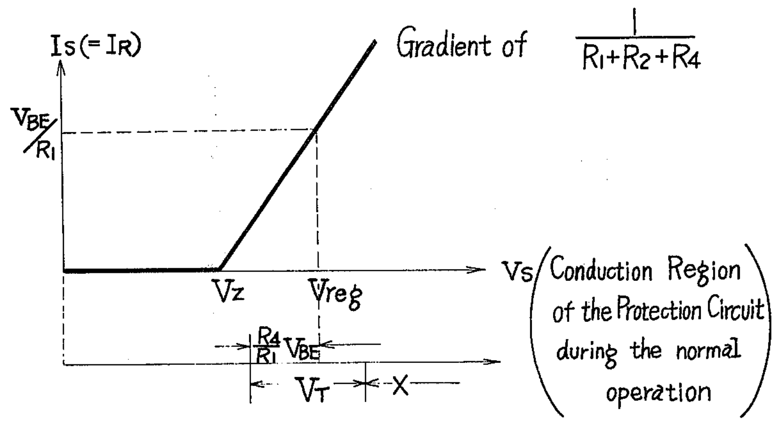
FIG. 3 is a graphical representation showing a relationship between a regulated voltage and a current during a normal operation.

FIG. 3 shows a relationship between $I_S$ and $V_S$, in which the abscissa shows $V_S$ and the ordinate $I_S$. It is noted from FIG. 3 that no current flows through the voltage sensing circuit 11 until $V_S$ exceeds $V_Z$ of voltage drop across the zener diode 113. When $V_S$ exceeds $V_Z$, $I_S$ begins to increase in proportion to $V_S$ with a gradient given by $$\frac{1}{R_1 + R_2 + R_4},$$

and when $I_S$ attains the value of $V_{BE}/R_1$ the control transistor 8 is made conductive, whereby the output voltage of the generator 2 is regulated at $V_{reg}$.

In this stage, a voltage $V_G$ appearing at a terminal G to be connected to the positive terminal 2*b* and for making the protection circuit 10 conductive is given by the following equation (3).

$$V_G = V_B + V_{Z1} + V_T$$
$$= (V_{reg} - \frac{V_{BE}}{R_1}R_4 - V_Z) + V_{Z1} + V_T \quad (3)$$

In the normal operation, the system of the present invention should operate in response to the voltage $V_S$ applied to the terminal S. For this purpose, it is required that $V_G$ is larger than $V_{reg}$, that is, $V_G > V_{reg}$. Then $$V_G - V_{reg} = -\frac{R_4}{R_1}V_{BE} - V_Z + V_{Z1} + V_T > 0 \quad (4)$$

When the system of the present invention is fabricated into one-chip integrated circuit, it results in $V_{Z1} = V_Z$, and thereby the equation (4) is rewritten as follows.

$$V_G - V_{reg} = V_T - \frac{R_4}{R_1}V_{BE} > 0 \quad (5)$$

This relationship is shown in FIG. 3.

And it is further noted from the equation (5) that $$R_1 > R_4 \quad (6)$$

since $V_T \approx V_{BE}$.

Figure 4:
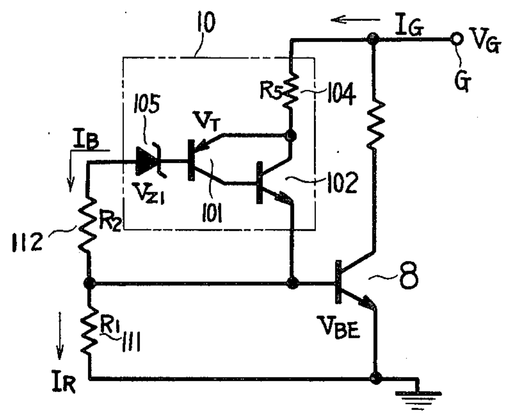
FIG. 4 is a partial circuit diagram of FIG. 1 showing circuit constant for explanation of the operation thereof when a first malfunction occurs.

When the first malfunction, that is, the voltage sensing circuit 11 is disconnected from both the battery 1 and the generator 2 due to the line failure of the positive conductor 22, occurs, the output voltage of the generator 2 is controlled by the voltage $V_G$ supplied to the terminal G. Assuming the circuit constant in this event as designated in FIG. 4, the following equation (7) is introduced when the control transistor 8 is in the nonconduction state.

$$I_R = I_G \quad (7)$$

A base current $I_B$ of the transistor 101, namely, current flowing through the resistor 112 is a negligibly small quantity in comparison with $I_R$, since $$I_B = \frac{1}{h_{FE}}I_R,$$

wherein the amplification factor $h_{FE}$ is the product of the amplification factor $h_1$ of the transistor 101 by that $h_2$ of the transistor 102.

Accordingly, $$I_R >> I_B \quad (8)$$

Therefore, the voltage $V_G$ appearing at the terminal G is introduced from the above equations (7) and (8) as follows.

$$V_G = I_R \cdot R_1 + I_B \cdot R_2 + V_{Z1} + V_T + I_G \cdot R_5$$

$$\approx I_R \cdot R_1 + 0 + V_{Z1} + V_T + I_G \cdot R_5$$

$$= I_R (R_1 + R_5) + V_{Z1} + V_T \qquad (9)$$

A desired regulated voltage $V_N$ of the generator in this event is the voltage $V_G$ determined when the control transistor 8 is made conductive, that is, when the base potential $I_R \cdot R_1$ of the control transistor 8 reaches to the voltage $V_{BE}$ across the base-emitter thereof.

Therefore, the regulated voltage $V_N$ is given by the following equation (10).

$$V_S = \frac{V_{BE}}{R_1}(R_1 + R_5) + V_{Z1} + V_T \qquad (10)$$

Figure 5:
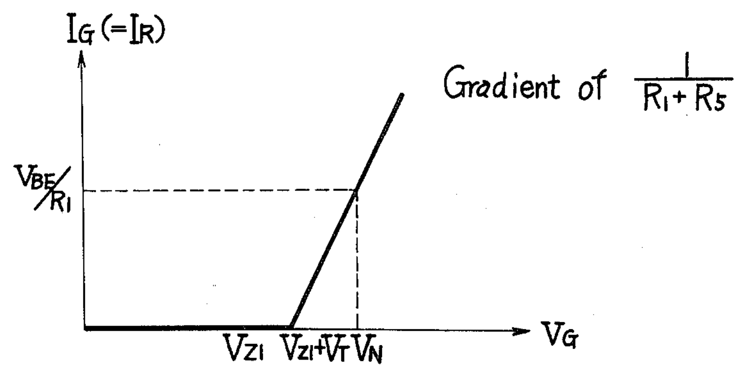
FIG. 5 is a graphical representation showing a relationship between a regulated voltage and a current during the first malfunction.

FIG. 5 shows a relationship between $I_G$ and $V_G$, in which the abscissa indicates $V_G$ and the ordinate $I_G$.

It is noted that $I_G$ begins to increase with a gradient given by $$\frac{1}{R_1 + R_5}$$

when $V_G$ exceeds the value of $V_{Z1} + V_T$.

When the second malfunction, that is, the power supply conductor 23 is disconnected from the generator 2, occurs, the voltage sensing circuit 11 senses the battery voltage $V_O$ which is less than that $V_G$ generated at the generator 2.

Figure 6:
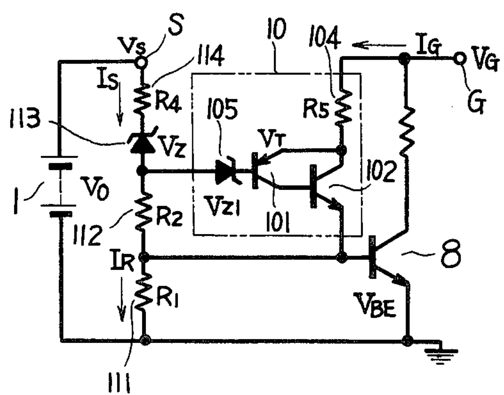
FIG. 6 is a partial circuit diagram of FIG. 1 showing circuit constant for explanation of the operation thereof when a second malfunction occurs.

Assuming the circuit constant in this event as designated in FIG. 6, $V_S$ and $V_G$ respectively appearing at the terminals S and G are given by the following equations (11) and (12).

$$V_S = V_0 = I_S \cdot R_4 + V_Z + (I_S + I_B) R_2 + (I_S + I_G) R_1$$

$$= I_S (R_1 + R_2 + R_4) + V_Z + I_G \cdot R_1 \qquad (11)$$

since $I_B$ is a negligibly small quantity.

$$V_G = I_G \cdot R_5 + V_T + V_{Z1} + (I_S + I_B) R_2 + (I_S + I_G) R_1$$

$$= I_G \cdot R_5 + V_T + V_{Z1} + I_S \cdot R_2 + (I_S + I_G) R_1 \qquad (12)$$

since $I_B$ is a negligibly small quantity.

A desired regulated voltage $V_{N'}$ of the generator in this event is the voltage $V_G$ determined when the control transistor 8 is made conductive, that is, when the base potential $I_R \cdot R_1$ of the control transistor 8 attains to the voltage $V_{BE}$ across the base-emitter thereof.

Because of $$I_R \; (= I_S + I_G) = \frac{V_{BE}}{R_1} \qquad (13)$$

the regulated voltage $V_{N'}$ is given by the following equation (14).

$$V_{N'} = V_G = V_{Z1} + V_T + (V_0 - V_Z) \frac{R_2 - R_5}{R_2 + R_4} + I_R \left\{ R_5 + \frac{R_1(R_4 + R_5)}{R_2 + R_4} \right\} \qquad (14)$$

since from the above equations (11), (12) and (13), the following equations (15), (16) and (17) are introduced.

$$I_S = \frac{(V_G - V_T - V_{Z1}) R_1 - (V_0 - V_Z)(R_1 + R_5)}{R_1(R_1 + R_2) - (R_1 + R_5)(R_1 + R_2 + R_4)} \qquad (15)$$

$$I_G = \frac{-(V_G - V_T - V_{Z1})(R_1 + R_2 + R_4) + (V_0 - V_Z)(R_1 + R_2)}{R_1(R_1 + R_2) - (R_1 + R_5)(R_1 + R_2 + R_4)} \qquad (16)$$

$$I_R = \frac{(V_0 = V_{Z1})(R_2 - R_5) - (V_G - V_T - V_{Z1})(R_2 + R_4)}{-(R_1 \cdot R_4 + R_5 \cdot R_1 + R_2 \cdot R_5 + R_4 \cdot R_5)} \qquad (17)$$

Substituting the above equations (15) and (16) for $I_S$ and $I_G$ in the equation (12), the equation (14) is introduced.

On the other hand when the transistor 101 is in the nonconduction state, no current flows therethrough, that is $I_G = 0$.

Accordingly, $$V_0 = I_S(R_1 + R_2 + R_4) + V_Z \qquad (18)$$

Figure 7:
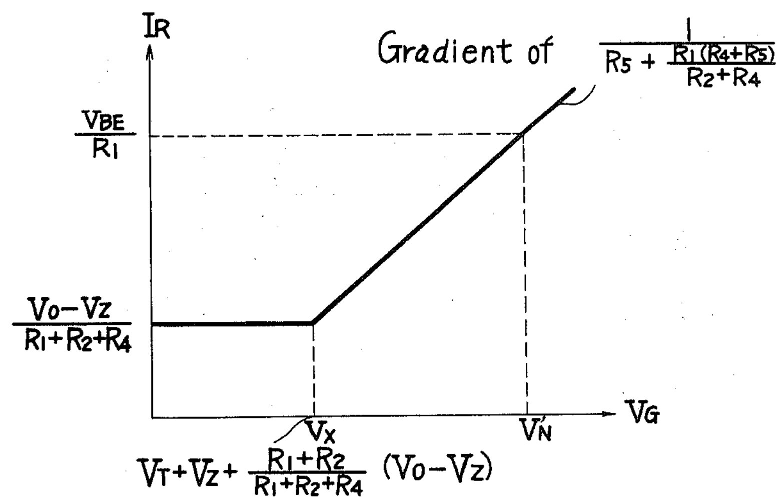
FIG. 7 is a graphical representation showing a relationship between a regulated voltage and a current during the second malfunction.

FIG. 7 shows a relationship between $I_R$ and $V_G$, in which the abscissa indicates $V_G$ and the ordinate $I_R$.

A voltage $V_X$ where $I_R$ begins to increase, namely where the transistor 101 becomes conductive, is introduced as follows.

From the equation (18), $$I_R = \frac{V_0 - V_Z}{R_1 + R_2 + R_4} \qquad (18)'$$

since $I_S = I_R$ when the transistor 101 is nonconductive. Then substituting the equation (18)' for $I_R$ in the equation (14), $$V_X = V_G = V_T + V_{Z1} + (V_0 - V_Z) \frac{R_1 + R_2}{R_1 + R_2 + R_4}$$

And above the voltage $X_V$, $I_R$ increases with a gradient of $$\frac{1}{R_5 + \frac{R_1(R_4 + R_5)}{R_2 + R_4}}$$

Figure 8:
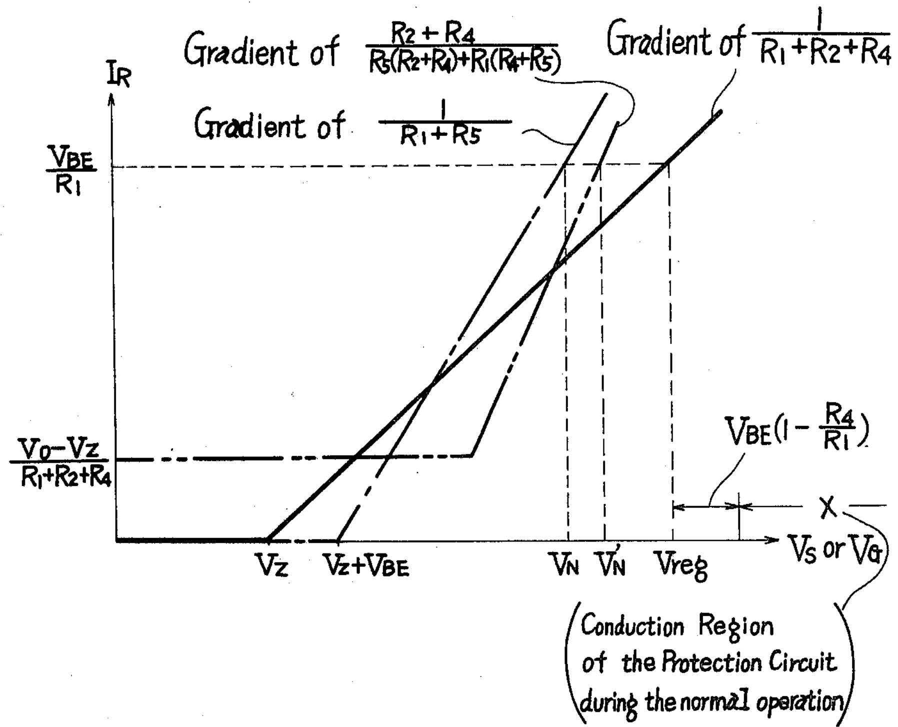
FIG. 8 is a graphical representation making FIGS. 3, 5 and 7 in a single figure.

FIG. 8 shows the relationship between $I_R$ and $V_G$ shown in FIGS. 3, 5 and 7 in one drawing.

According to this drawing, it is noted that the protection circuit 10 becomes inoperative during the normal condition, that is, the condition of no malfunction, by selecting $R_1$ to be larger than $R_4$ as indicated by the equations (4), (5) and (6), whereby the regulated voltage $V_{reg}$ is determined by $V_S$, and further that the regulated voltage $V_N$ or $V_{N'}$ in the malfunction can be selected not only to be larger than the voltage $V_{reg}$ by arranging $R_2$ and $R_5$ but also to be less than the voltage $V_{reg}$.

Figure 9:
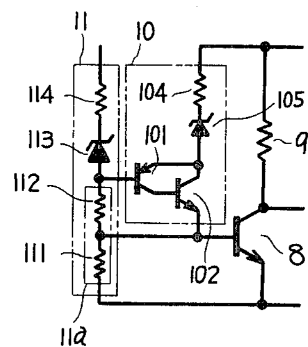
FIGS. 9, 10 and 11 are partial circuit diagrams of modified voltage regulating system which may be utilized in place of certain of components shown in FIG. 1.
Figure 10:
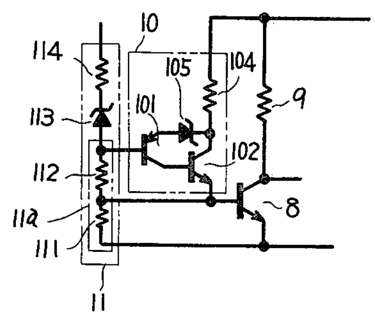
Figure 11:
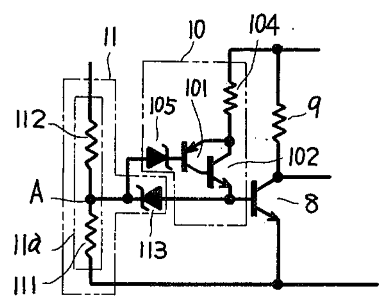

FIGS. 9, 10 and 11 show modified embodiments according to the present invention, in which the zener diodes 105 and 113 form various connections as shown. That is, diode 105 in FIGS. 9 and 10 is connected in different places than in FIG. 1 and in FIG. 11 diode 113 is differently connected than in FIGS. 1, 9 and 10.

What we claim is:

1. A voltage regulating system comprising;

an alternating current generator having an output winding and a field winding;

a full-wave rectifier connected with said output winding and providing a positive and negative direct current terminal;

a battery connected across said positive and negative terminal by conductors;

rectifier means connected with said full-wave rectifier and providing one other positive direct current terminal;

a field control circuit connected at one end thereof with said other positive terminal through said field winding and with said negative terminal at the other end thereof;

a control transistor connected with said field control circuit;

a voltage sensing circuit connected across said battery and further connected with said control transistor;

an additional circuit containing an emitter-base path of a PNP transistor and a zener diode connected between said other positive terminal and said voltage sensing circuit; and a collector-emitter path of a NPN transistor connected between said other positive terminal and the base of said control transistor, the base of said NPN transistor being connected with the collector of said PNP transistor.

2. A voltage regulating system comprising;

a source of direct current having positive and negative output terminals and including a generator having an output winding and a field winding;

voltage regulating means including a field control device, a voltage sensing circuit having a first and second resistor, a junction point of said first and second resistor being connected with said field control device for controlling the operation of said field control device, and a protection circuit having a zener diode and a PNP transistor, the current path of said zener iode and the emitter-base of said PNP transistor being connected between the end of said first resistor opposite the junction point and said positive output terminal, and the emitter-collector path thereof being connected with said junction point;

a battery connected with said source of direct current;

conductor means connecting said voltage sensing circuit across said battery whereby said voltage sensing circuit responds to the voltage applied to said battery from said power source; and a field energizing circuit coupled to said generator and connected with said field winding and with said field control device whereby field current is controlled by said field control device and is supplied by said generator through said field energizing circuit;

said protection circuit responding to the voltage applied thereto and controlling the output voltage of said generator in the event that the voltage applied to said voltage sensing circuit is insufficient to operate said voltage sensing circuit.

3. A voltage regulating system comprising;

an alternating current generator having a polyphase output winding and a field winding;

a bridge rectifier having direct current output terminals and AC input terminals connected with said polyphase winding;

a battery;

means connecting said battery across said direct current output terminals of said bridge rectifier;

a plurality of auxiliary diodes connected with said output winding of said generator, said auxiliary diodes and certain of the diodes of said bridge rectifier providing field energizing current output terminals;

a field control transistor having emitter, collector and base electrodes;

means connecting said field winding and the collector and emitter electrodes of said transistor in series across said field energizing direct current output terminals;

a voltage divider having a first and a second resistor connected across said battery;

a voltage sensing circuit including said voltage divider and a first zener diode coupling said voltage divider and the base electrode of said transistor, said voltage sensing circuit being operative to bias said transistor conductive when the output voltage of said generator is below a desired regulated value and operative to bias said transistor nonconductive when said output voltage exceeds said desired regulated value; and a protection circuit including a second zener diode and a PNP transistor, the current path of said second zener diode and the emitter-base of said PNP transistor being connected between said first resistor and the positive terminal of said field energizing direct current output terminals and the emitter-collector path thereby being connected with the base electrode of said field control transistor, whereby said protection circuit controls the conduction of said field control transistor when the output of said generator is insufficient to operate said voltage sensing circuit.

4. A voltage regulating system for regulating the output voltage of a generator having an output winding and a field winding comprising;

a field energizing circuit adapted to be connected across direct current terminals energized by said output winding, said field energizing circuit including the collector and emitter of a field control transistor;

a voltage divider adapted to be connected across other direct current terminals energized by said output winding;

a first zener diode connected with said voltage divider and coupled to the base of said field control transistor; and a protection circuit including a second zener diode and a PNP transistor, the current path of said second zener diode ad the emitter-base of said PNP transistor being connected between said voltage divider and the positive terminal of said direct current terminals energized by said output winding.

5. A voltage regulating system for an automotive vehicle comprising;

a first termimal adapted to be coupled to a battery;

a second terminal adapted to be coupled to a field winding an an output winding of a generator;

a voltage sensing circuit connected to said first terminal and including first, second and third resistors connected in series with each other for producing respectively at a first junction between said first and second resistors and at a second junction between said second and third resistors first and second voltages in response to voltage from said battery;

control means operatively connected to said first junction for preventing current flow through said field winding when said first voltage at said first junction exceeds a first preset level and for thereby controlling the voltage at said first terminal at a first regulated value; and additional circuit means operatively related to said control means and connected between said second junction and said second terminal, said additional circuit means being operative to energize said control means for preventing current through said field winding when both (1) the difference between the voltage at said second terminal and said second voltage at said second junction exceeds a second preset level and (2) said first voltage at said first junction is below said first preset level, thereby controlling the voltage at said second terminal at a second regulated value lower than said first regulated value.

6. A voltage regulating system comprising;

a voltage sensing circuit adapted to be connected across a battery mounted in an automotive vehicle so as to respond to the battery voltage;

a control transistor connected at its base to said voltage sensing circuit and being driven thereby into a conductive state when said battery voltage exceeds a first preset level;

switching means operatively related to said control transistor and adapted to be connected with a field winding of a generator mounted in said automotive vehicle, said switching means preventing current flow through said winding when the control transistor is in the conductive state;

an NPN transistor having a collector-emitter path adapted to be connected between the field winding of said generator and the base of said control transistor;

a PNP transistor having an emitter-collector path between the collector and a base of said NPN transistor; and a zener diode connected between said voltage sensing circuit and a base of said PNP transistor;

said NPN transistor, PNP transistor and zener diode being operative only when said battery voltage is below said first preset level and when an output voltage is developed by said generator which exceeds a second preset level, lower than said first preset level, to drive said control transistor into the conductive state.

* * * * *